United States Patent
Viraraghavan et al.

(10) Patent No.: US 11,243,697 B1
(45) Date of Patent: Feb. 8, 2022

(54) DESIGNING A COMPUTERIZED STORAGE SYSTEM HAVING A PRESCRIBED RELIABILITY

(71) Applicant: International Business Machines Corporation, Armonk, NY (US)

(72) Inventors: Praveen Viraraghavan, Chicago, IL (US); Ilias Iliadis, Rueschlikon (CH); Mark Alfred Lantz, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/159,201

(22) Filed: Jan. 27, 2021

(51) Int. Cl.
*G06F 3/06* (2006.01)

(52) U.S. Cl.
CPC ............ *G06F 3/0619* (2013.01); *G06F 3/067* (2013.01); *G06F 3/0616* (2013.01); *G06F 3/0653* (2013.01); *G06F 3/0683* (2013.01)

(58) Field of Classification Search
CPC .... G06F 3/0619; G06F 3/0616; G06F 3/0653; G06F 3/067; G06F 3/0683
See application file for complete search history.

(56) References Cited

U.S. PATENT DOCUMENTS

| | | | | |
|---|---|---|---|---|
| 7,467,329 B1* | 12/2008 | Keeton | ................. | G06F 11/008 714/15 |
| 7,536,585 B1* | 5/2009 | Keeton | ................. | G06F 11/008 714/33 |
| 7,644,046 B1* | 1/2010 | Keeton | ............... | G06F 11/3447 705/400 |
| 8,001,059 B2* | 8/2011 | Takezawa | .............. | G06Q 10/06 705/400 |
| 8,041,984 B2 | 10/2011 | Kalos | | |
| 9,535,626 B1* | 1/2017 | Haas | ..................... | G06F 3/0647 |
| 10,579,281 B2 | 3/2020 | Cherubini | | |
| 2005/0102547 A1* | 5/2005 | Keeton | ................. | G06F 11/008 714/1 |
| 2017/0109083 A1* | 4/2017 | Iliadis | ................... | G06F 3/0619 |
| 2019/0129979 A1 | 5/2019 | Biao | | |

OTHER PUBLICATIONS

Iliadis et al., "Expected Annual Fraction of Data Loss as a Metric for Data Storage Reliability", 2014 IEEE 22nd International Symposium on Modelling, Analysis & Simulation of Computer and Telecommunication Systems, DOI 10.1109/MASCOTS.2014.53, 10 pages.

Iliadis et al., "Most Probable Paths to Data Loss: An Efficient Method for Reliability Evaluation of Data Storage Systems", International Journal on Advances in Systems and Measurements, vol. 8 No. 3 & 4, year 2015, http://www.iariajournals.org/systems_and_measurements/, 23 pages, IARIA—www.iaria.org 2015.

(Continued)

*Primary Examiner* — Hiep T Nguyen
(74) *Attorney, Agent, or Firm* — David B. Woycechowsky

(57) ABSTRACT

Technology for choosing a design for a computer data storage system having a prescribed reliability. The selection of a "matching storage system," matching the prescribed reliability is based on computation of first and second reliability indicators.

20 Claims, 4 Drawing Sheets

(56) References Cited

OTHER PUBLICATIONS

Iliadis et al., "Reliability Evaluation of Erasure Coded Systems", International Journal on Advances in Telecommunications, vol. 10 No. 3 & 4, year 2017, http://www.iariajournals.org/telecommunications/, 27 pages, IARIA 2017.

Iliadis, Ilias, "Data Loss in RAID-5 and RAID-6 Storage Systems with Latent Errors", International Journal on Advances in Software, vol. 12 No. 3 & 4, year 2019, http://www.iariajournals.org/software/, IARIA 2019, 29 pages.

Iliadis, Ilias, "Reliability Evaluation of Erasure Coded Systems under Rebuild Bandwidth Constraints", International Journal on Advances in Networks and Services, vol. 11 No. 3 & 4, year 2018, http://www.iariajournals.org/networks_and_services/, 30 pages, IARIA 2018.

Iliadis et al., "An Efficient Method for Reliability Evaluation of Data Storage Systems", CTRQ 2015 : The Eighth International Conference on Communication Theory, Reliability, and Quality of Service, 7 pages.

Paris et al., "Highly Reliable Two-Dimensional RAID Arrays for Archival Storage" IPCCC 2012, Downloaded on Dec. 20, 2020 at 17:52:11 UTC from IEEE Xplore, 8 pages.

Xin et al., "Reliability Mechanisms for Very Large Storage Systems", Proceedings of the 20th IEEE/11th NASA Goddard Conference on Mass Storage Systems and Technologies (MSS'03), 11 pages.

\* cited by examiner

DESIGNING A COMPUTERIZED STORAGE SYSTEM HAVING A PRESCRIBED RELIABILITY

BACKGROUND

The invention relates in general to methods and computer program products for designing computerized storage systems. In particular, it is directed to methods of designing computerized storage systems having a prescribed reliability, based on indicators computed for storage units of the storage system, where such indicators include a mean time to data loss, an expected annual fraction of data loss, and an expected amount of data lost conditioned on a fact that a data loss occurred.

Several redundancy and recovery schemes have been developed to enhance the reliability of computerized storage systems. The effectiveness of these schemes has predominately been evaluated based on the mean time to data loss (MTTDL), which has been proven useful for assessing tradeoffs, for comparing schemes, and for estimating the effect of the various parameters on system reliability. In the context of distributed and cloud storage systems, it is of importance to further consider the magnitude along with the frequency of data loss. Therefore, one may further consider using the expected annual fraction of data loss (EAFDL), that is, the fraction of stored data that is expected to be lost by the system annually. A general methodology has been proposed to obtain the EAFDL metric analytically, in conjunction with the MTTDL metric, for various redundancy schemes and for a large class of failure time distributions that also includes real-world distributions, such as Weibull and gamma [6]. Such a methodology can be applied to derive these metrics analytically and assess the reliability of a replication-based storage system under clustered, declustered, and symmetric data placement schemes.

Another potentially relevant metric is the expected amount of data lost given that a data loss already occurred, which is noted E(H). The MTTDL, the EAFDL, and E(H), can be used to assess the reliability of a storage system having well-defined parameters. Such parameters may notably include the number of storage devices in the system, the memory storage capacity of each storage device, their mean time to failure, parameters relating to a data placement scheme of data throughout the storage devices, and characteristics of the protection schemes.

Thus, given certain system specifications, it is possible to very precisely determine the reliability of a system in terms of the metrics mentioned above. However, it turns out that the converse is typically not possible. That is, it is not possible to straightforwardly determine the characteristics of a system that has a prescribed reliability. This, in practice, is an issue because one may well want to be able to design a storage system having a prescribed reliability, where this reliability is precisely estimated.

The following references form part of the background art:

[1] I. Iliadis, "Reliability Evaluation of Erasure Coded Systems under Rebuild Bandwidth Constraints," International Journal on Advances in Networks and Services 11(3&4), 2018;

[2] Q. Xin, E. L. Miller, T. J. E. Schwarz, D. D. E. Long, S. A. Brandt, and W. Litwin, "Reliability Mechanisms for Very Large Storage Systems," in Proceedings of the 20th IEEE/11th NASA Goddard Conference on Mass Storage Systems and Technologies (MSST) (San Diego, Calif.), April 2003, pp. 146-156;

[3] J.-F. Paris, T. J. E. Schwarz, A. Amer, and D. D. E. Long, "Highly Reliable Two-Dimensional RAID Arrays for Archival Storage," in Proceedings of the 31st IEEE International Performance Computing and Communications Conference (IPCCC) (Austin, Tex.), December 2012, pp. 324-331;

[4] I. Iliadis and V. Venkatesan, "Most Probable Paths to Data Loss: An Efficient Method for Reliability Evaluation of Data Storage Systems," International Journal on Advances in Systems and Measurements vol. 8, no. 3&4, December 2015, pp. 178-200;

[5] I. Iliadis, "Data Loss in RAID-5 and RAID-6 Storage Systems with Latent Errors," International Journal on Advances in Software, vol. 12, no. 3&4, pp. 259-287, December 2019;

[6] I. Iliadis and V. Venkatesan, "Expected Annual Fraction of Data Loss as a Metric for Data Storage Reliability," 2014 IEEE 22nd International Symposium on Modelling, Analysis & Simulation of Computer and Telecommunication Systems, Paris, 2014, pp. 375-384; and

[7] Ilias Iliadis, "Reliability Evaluation of Erasure Coded Systems," International Journal On Advances in Telecommunications 10(3&4), pp. 118-144, 2017.

SUMMARY

According to a first aspect, the present invention is embodied as a computer-implemented method of designing a storage system having a prescribed reliability. The method first comprises formulating specifications for each candidate of a set of candidate storage systems, wherein said each candidate comprises two or more storage units, each including a set of storage devices. Next, for each candidate, a reliability of the candidate is determined by computing first reliability indicators and second reliability indicators. The first reliability indicators are computed for each distinct type of storage units of each candidate based on first parameters obtained from the specifications formulated for each candidate. The second reliability indicators are computed for each candidate based on second parameters obtained from the first reliability indicators. Accordingly, a set of second reliability indicators is eventually obtained, which correspond to the set of candidate storage systems, respectively. Then, given indicators are identified, within the set of second reliability indicators, where the given indicators match the prescribed reliability. The identified indicators correspond to a given storage system of the candidate storage systems, the specifications of which are stored, for example, in view of building the given storage system or reconfiguring an existing system for it to match the specifications of the given storage system.

The indicators are preferably computed using a stochastic analysis. That is, the proposed method may take advantage of known theoretical schemes to compute the reliability indicators for the second layer and then for the whole system and, this, for each candidate system. However, as noted earlier, the theoretical schemes used to compute such indicators are difficult, if not impossible, to reverse. As a result, it is not possible (or at least very difficult), given a prescribed reliability of the system, to directly compute a suitable system architecture and configuration. For example, the first reliability indicators may be computed thanks to first functions (for example, analytic function) taking the first parameters as arguments, while the second reliability indicators are computed thanks to second functions taking the second parameters as arguments, where each of the first functions and the second functions are non-invertible functions. To overcome this hurdle, the present method relies on a nested scheme, which, given many potential architectures inferred, computes system reliabilities by propagating reliability indicators from one layer to the next and then select a candidate system matching the prescribed reliability. This makes it possible to identify precise system architectures and configurations that match a prescribed reliability.

In embodiments, the first reliability indicators and the second reliability indicators comprise, each, a mean time to data loss, or MTTDL, and an expected annual fraction of data loss, or EAFDL. Moreover, the first reliability indicators additionally comprise an expected amount of data lost conditioned on a fact that a data loss occurred, or EADLC. This allows the system reliability to be much more accurately evaluated than before, because the equivalent memory storage capacity at risk of each storage unit can be judiciously obtained from the corresponding EADLC, which reflects the amount of data lost upon failure as opposed to the total amount of data stored in a storage unit.

In that respect, the method preferably further comprises, for each candidate and prior to computing the second reliability indicators, estimating an equivalent memory storage capacity at risk of each of the storage units of a candidate based on the EADLC computed for each distinct type of the storage units. Note, the equivalent capacity at risk refers to an exposed capacity or a vulnerable capacity, that is, a resulting affected capacity as perceived by the higher protection layer. The second parameters are notably obtained based on the MTTDL as computed for each distinct type of the storage units and the equivalent memory storage capacity at risk as estimated for each of the storage units. That is, the equivalent capacity at risk of each storage unit is estimated for reliability assessment purposes, based on the EADLC values, which makes it possible to more precisely estimate the actual capacity of the storage units, on the second level.

In preferred embodiments, the first parameters include a mean time to failure, or MTTF, of each of the storage devices. In addition, the second parameters include a MTTF of each distinct type of the storage units. The MTTF of each distinct type of the storage units is obtained by setting it equal to the MTTDL as computed for said each distinct type of the storage units. Setting the next-level MTTF values equal to the MTTDL values obtained from a previous level provides a simple means to propagate reliability computations to a next level, given that the functions typically used to compute the reliability indicators require MTTF values as inputs but provide MTTDL values in output.

Preferably, said first parameters include, in addition to the MTTF of each of the storage devices: a number of storage devices of the candidate; and a memory storage capacity of each of the storage devices of the candidate.

More preferably, the first parameters additionally include parameters relating to a data placement scheme of data throughout the storage devices of the storage units. Said data placement scheme may advantageously be a declustered data placement scheme. Such a placement scheme is found to offer superior reliability, according to metrics developed by embodiments of the present invention. In variants, the data placement scheme may be a symmetric data placement scheme or a clustered data placement scheme. Still, the set of candidate storage systems may involve distinct types of data placement schemes. For example, the set of candidate storage systems may comprise at least one system assuming a symmetric data placement scheme, at least one system assuming a clustered data placement scheme, and at least one system assuming a declustered data placement scheme.

In embodiments, the first parameters additionally include a rebuild bandwidth of each of the storage devices. Preferably, the first parameters additionally include parameters of a protection scheme of the storage devices of the storage units.

In preferred embodiments, the second parameters additionally include a number of the storage units. Preferably, the second parameters additionally include parameters related to a protection scheme of the storage units of said each candidate.

In embodiments, at least one of the storage units of one or more of the candidate storage systems may be a storage pod (for example, capable of storing up to a petabyte of data, or more), the storage devices of which are hard disk drives. Each of the storage units of each of the candidate storage systems may possibly be a storage pod including hard disk drives. In particular, each of the storage units may be assumed to be configured in each candidate as a redundant array of independent disks.

Other embodiments may combine various features as described above. For instance, another aspect of the invention concerns a computer-implemented method of designing a storage system having a prescribed reliability, where the method first comprises formulating specifications for each candidate of a set of candidate storage systems. Each candidate comprises two or more storage units, each including a set of storage devices. Next, for each candidate, a reliability of the candidate is determined by: computing first reliability indicators for each distinct type of storage units of each candidate; estimating an equivalent memory storage capacity at risk of each storage unit; and then computing second reliability indicators for each candidate. Namely, the first reliability indicators are computed based on first parameters obtained from the specifications formulated for said each candidate. The first reliability indicators comprise a MTTDL, an EAFDL, and an EADLC. The equivalent memory storage capacity at risk of each of the storage units of each candidate is estimated based on the EADLC computed for each distinct type of the storage units. The second reliability indicators include an MTTDL and an EAFDL, computed based on second parameters obtained according to the MTTDL as computed for each distinct type of the storage units and the equivalent memory storage capacity at risk as estimated for each of the storage units. Accordingly, a set of second reliability indicators is finally obtained, which correspond to the set of candidate storage systems, respectively. Then, given indicators are identified within said set of second reliability indicators, where the given indicators match the prescribed reliability. The identified indicators correspond to a given storage system of the candidate storage systems, the specifications of which are stored, for example, in view of reconfiguring an existing system or building a given storage system that matches the specifications of the given storage system.

In that respect, a further aspect of the invention concerns a method of building a storage system. This method first comprises designing the storage system by performing a method of designing a storage system such as described above. Eventually, the storage system is built based on the stored specifications of the given storage system.

According to a final aspect, the invention is embodied as a computer program product for designing a storage system having a prescribed reliability. The computer program product comprises a computer readable storage medium having program instructions embodied therewith. The program instructions are executable by processing means, so as to cause the processing means to perform all the steps of a method of designing a storage system as described above.

In embodiments, the program instructions may further cause the processing means to estimate, for each candidate and prior to computing the second reliability indicators, an equivalent memory storage capacity at risk of each of the storage units of the candidate based on the EADLC computed for each distinct type of the storage units. The second parameters are notably obtained based on the MTTDL as computed for each distinct type of the storage units and the equivalent memory storage capacity at risk as estimated for each of the storage units.

According to an aspect of the present invention, there is a method, computer program product and/or system that performs the following operations (not necessarily in the following order): (i) formulates specifications for each candidate storage system design of a plurality of candidate storage system designs, wherein said each candidate storage system design includes a plurality of storage units, with each candidate storage system design including a set of storage devices; (ii) for each given candidate storage system design of the plurality of candidate storage system designs, determines a reliability of the given candidate storage system design by: (a) computing a plurality of first reliability indicators for each distinct type of the storage units of the given candidate storage system design based on first parameters obtained from the specifications formulated for the given candidate storage system design, and (b) computing a plurality of second reliability indicators for the given candidate storage system design, based on second parameters obtained from the first reliability indicators; (iii) identifies, within the plurality of second reliability indicators, matching indicator(s) that match the prescribed reliability and that correspond to a matching storage system design from the plurality of candidate storage system designs; and (iv) stores the specifications of the matching storage system design.

BRIEF DESCRIPTION OF THE DRAWINGS

These and other objects, features and advantages of the present invention will become apparent from the following detailed description of illustrative embodiments thereof, which is to be read in connection with the accompanying drawings. The illustrations are for clarity in facilitating one skilled in the art in understanding the invention in conjunction with the detailed description. In the drawings.

The accompanying drawings show simplified representations of devices or parts thereof, as involved in embodiments. Similar or functionally similar elements in the figures have been allocated the same numeral references, unless otherwise indicated.

Methods and computer program products embodying the present invention will now be described, by way of non-limiting examples.

DETAILED DESCRIPTION OF EMBODIMENTS OF THE INVENTION

The following description is structured as follows. First, general embodiments and high-level variants are described in section 1. Section 2 addresses more specific embodiments and technical implementation details. Note, the methods disclosed herein, and their variants are collectively referred to as the "present methods". All references Sn refer to methods steps of the flowchart of FIG. 1, while numeral references pertain to devices, units, components, or concepts involved in embodiments.

1. General Embodiments and High-Level Variants

In reference to FIGS. 1-4, an aspect of the invention is first described, which concerns a computer-implemented method of designing a computerized storage system having a prescribed reliability. Basically, the gist of the method is to infer specifications for several storage systems (referred to as candidates) and compute reliability indicators (that is, metrics) of each candidate by propagating reliability indicators across hierarchical levels of each candidate.

Figure 2:
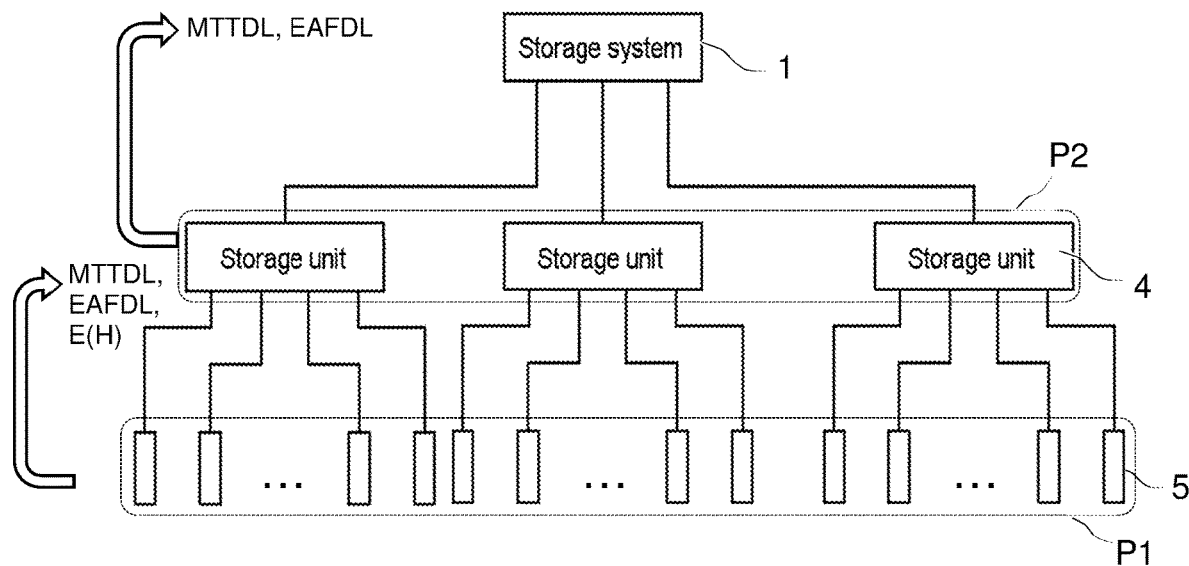
FIGS. 2 and 3 are hierarchical representations of storage systems, illustrating how reliability indicators can be propagated from one level to the next level in the hierarchy, according to embodiments.
Figure 3:
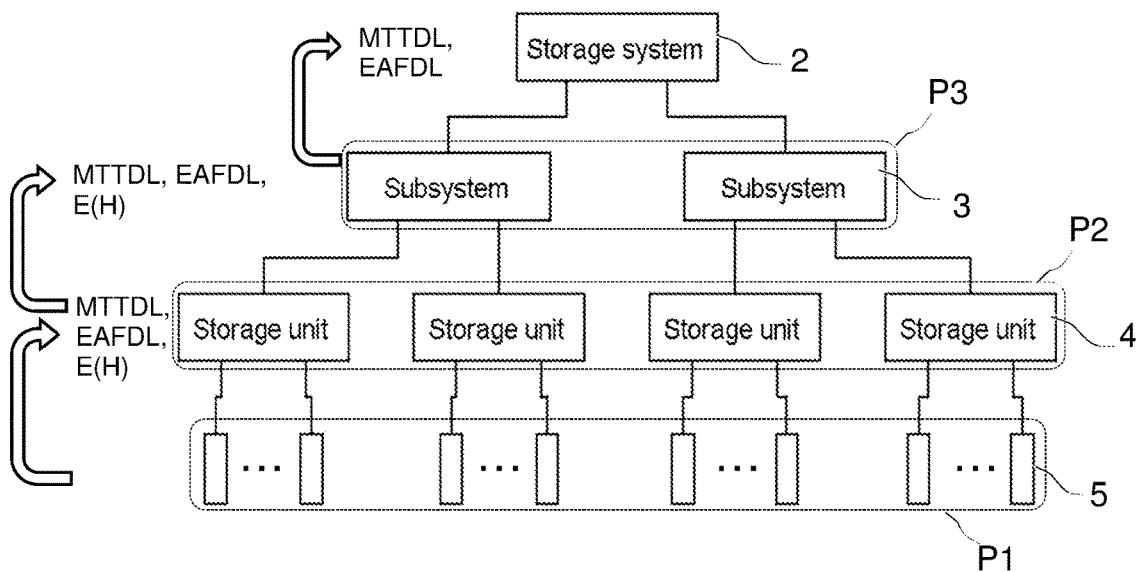

Examples of storage systems 1, 2 are depicted in FIGS. 2 and 3. Each candidate system is assumed to comprise two or more storage units 4. Each storage unit 4 is assumed to include a set of storage devices 5 (also be referred to as internal media devices), such as hard disk drives (HDDs) or solid-state drives (SSDs). Thus, each candidate system 1, 2 can be regarded as a multilevel or hierarchical system including storage devices 5 on a first level, where the storage devices are grouped into storage units 4 on a second level in the hierarchy, as in FIGS. 2 and 3. The storage units may possibly be grouped into subsystems (as in FIG. 3), which may form a further level, and so on. Each candidate system corresponds to a hierarch in its own hierarchy, for example, similar to the root node of a tree. Accordingly, the systems 1, 2 are represented as tree structures in the examples of FIGS. 2 and 3.

Distinct types of storage units 4 can be contemplated, even within a same candidate system. In variants, some or each of the candidate storage systems may include storage units of a same type. Such storage units may include a same number of internal devices, each of a same type, at least within a same candidate system. For example, one or more of the storage units 4 of one or more of the candidates may be a storage pod 4 including HDDs 5. Each storage unit 4 of each candidate may possibly be such a storage pod. In embodiments, each of the storage units 4 of each candidate may be assumed to be configured as a redundant array of independent disks (RAID). More generally, though, the storage units of a given storage system may differ in the number of devices in a storage unit, the types of storage devices 5, and the mix of storage devices 5 they contain. For example, one storage unit 4 may include 32 HDDs, another may include 40 HDDs, and yet another storage unit 4 may include 8 SSDs and 32 HDDs. Thus, the candidate systems may differ in terms of numbers of subsystems 3, numbers of storage units 4, and numbers of storage devices 5 in each storage unit 4, as well as the types of storage devices 5 and storage units 4. In addition, the candidate systems may differ in terms of protection schemes, rebuild bandwidth, and other parameters. So, one understands that a wide range of configurations may be contemplated for the candidate systems.

In the example of FIG. 2, the system 1 decomposes into storage units 4 (on the second level), themselves decomposing into storage devices 5 (on the first level), where each level benefits from its own protection scheme P1, P2. In the example of FIG. 3, the system 2 decomposes into subsystems 3 (third level), themselves composed of storage units 4 (second level), which include, each, a set of storage devices 5 (first level). Again, each level may benefit from its own protection scheme P1, P2, P3. More generally, more than three levels may be contemplated.

Figure 1:
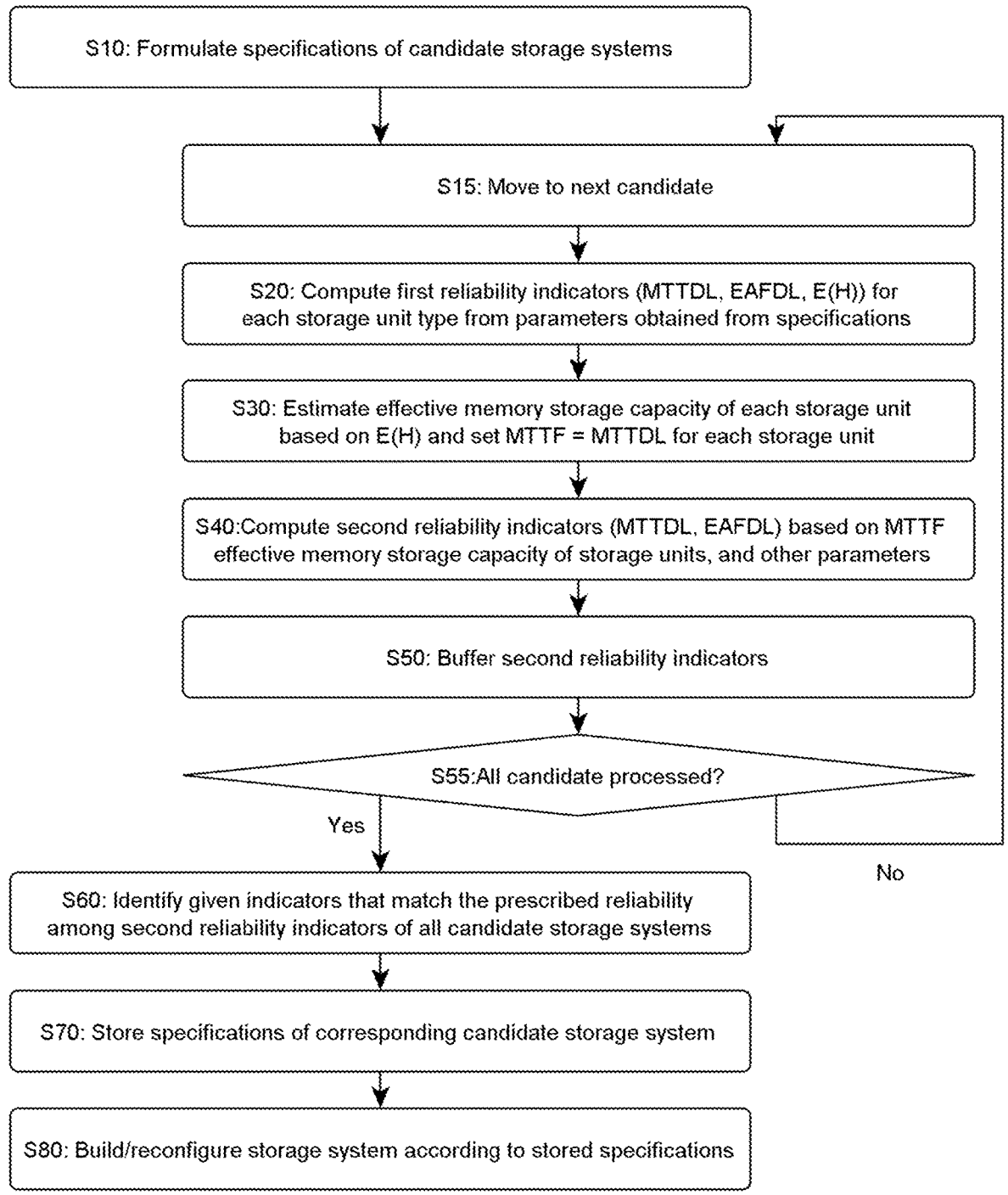
FIG. 1 is a flowchart illustrating high-level steps of a method of designing and building a storage system, according to embodiments.

The design method proposed is the following. First, a set of candidate storage systems 1, 2 need to be defined. As seen in FIG. 1, step S10, the method first comprises formulating specifications for each candidate system of this set. Such specifications aggregate or reflect configurational parameters of each candidate. Such parameters may notably include the number of storage devices, storage units, subsystems, etc., in each candidate system, as well as the memory storage capacity of each storage device, the number of storage units, their mean time to failure or other similar characteristics, parameters relating to a data placement scheme of data throughout the storage devices, the rebuild bandwidth, and characteristics of the protection schemes at each level of the hierarchy.

Next, for each candidate (step S15), a reliability of this candidate is determined, see steps S20 to S40. This is achieved by computing two types of indicators, hereafter referred to as first reliability indicators and second reliability indicators.

The first reliability indicators are computed S20 for each distinct type of the storage units 4 of the current candidate. The first reliability indicators are computed based on first parameters, which are obtained from the specifications as formulated S10 for this candidate. The second reliability indicators are then computed S40 for the current candidate, based on second parameters, which are obtained from the first reliability indicators.

Once all candidates have been processed (step S55: Yes), a set of second reliability indicators are obtained; the set of second reliability indicators correspond to the set of candidate storage systems, respectively.

Then, given indicators are identified within the set of second reliability indicators, step S60. The identified indicators are indicators that match the prescribed reliability, as desired for the system to be achieved. Such indicators correspond to a given storage system of the set of candidates. The specifications of the given storage system are finally stored, step S70, in view of building this storage system or reconfiguring an existing system for it to match the given specifications.

In other words, a propagation scheme is relied upon, which allows reliability indicators to be propagated from one level to the next level, so as to obtain reliability indicators for each candidate system. The same operations are repeated (or concurrently performed, that is, in parallel) for each candidate system, the aim being to eventually identify at least one suitable system. All required computations S10-S60 can typically be performed in main memory, without it being needed to store intermediate values on disks. The final results S70, however, and the corresponding system parameters, are typically stored permanently and forwarded to a suitable entity (for example, a client or user), in view of building or reconfiguring an actual storage system.

The first indicators are preferably computed using a stochastic analysis, as discussed below in reference to preferred embodiments. The proposed method may, for example, take advantage of theoretical schemes as proposed in [1, 5, 6, 7] to compute metric values (that is, reliability indicators) for the second layer and then for the whole system and for each candidate system. However, such metrics are difficult to reverse. That is, it is not possible (or at least very difficult), given a prescribed reliability of the system, to directly compute a suitable system architecture and configuration.

Beyond the theoretical schemes proposed in [1, 5, 6, 7], other functions may similarly be devised to compute the indicators. So, in general, the first reliability indicators may be computed S20 thanks to first functions, which take the first parameters as arguments (that is, as inputs). Similarly, the second reliability indicators may be computed S40 thanks to second functions taking the second parameters as arguments. The second functions and the first functions may possibly have one or two functions in common, as assumed in embodiments discussed below. However, such functions will typically be non-invertible functions. In particular, each of the first functions and the second functions evoked above may be a non-invertible function.

Thus, what is proposed here is a nested scheme, which, given many potential architectures inferred at step S10, computes S20-S40 system reliabilities by propagating metric values from one layer to the next and then select S70 a system matching the prescribed reliability.

Another, yet related, aspect of the invention concerns a method of building a storage system. This additional method first comprises designing the storage system by performing steps S10-S70 as described above. Then, the storage system is built S80 based on the specifications of a matching storage system, as stored at step S70. This storage system may for instance be configured as an information repository system or as a tiered storage, also known as hierarchical storage system. In variants, an existing system may simply be reconfigured, to match specifications as stored at step S70, as noted earlier.

In embodiments, the first reliability indicators and the second reliability indicators comprise, each, a mean time to data loss (MTTDL) and an expected annual fraction of data loss (EAFDL). The MTTDL and EAFDL may for instance be obtained through the first and second functions evoked above, that is, at each of the storage unit level and the system level. In addition, the first reliability indicators may comprise an expected amount of data lost conditioned on a fact that a data loss occurred (EADLC). Note, EADLC is an acronym; the EADLC is typically noted E(H) in the references cited in the background sections, where E(.) stands for the expectation value and H denotes the amount of data lost, given that data loss has occurred. Therefore, E(H) denotes the expected amount of data lost, given that data loss has occurred.

The quantity E(H) can advantageously be used in place of the basic capacity of the generic storage devices. Indeed, in practice, loosing storage devices (for example, internal media devices) does not necessarily imply a loss of all the data stored on such devices. As it may be realized, only the expected amount E(H) of data needs to be recovered by the second protection layer P2 corresponding to the storage unit level. Thus, instead of relying on the basic capacity of the generic storage devices, the computations of the reliability indicators may judiciously involve E(H).

In variants to MTTDL, EAFDL, and E(H) indicators, other indicators may possibly be used. Indeed, various metrics may possibly be devised to estimate the reliability of the storage devices, the storage units, and eventually the systems. However, such metrics will typically be difficult to reverse in practice, hence the advantages of the present methods.

In embodiments, the method further comprises estimating (step S30) an equivalent memory storage capacity at risk of each of the storage units 4 of the candidate, based on the EADLC computed for each distinct type of the storage units. The equivalent capacity at risk is associated with data already lost, namely, the expected amount E(H) of data lost conditioned on a fact that a data loss occurred. The equivalent capacity at risk can be regarded as an equivalent affected capacity, that is, an exposed capacity or a vulnerable capacity, that is, a resulting affected capacity as perceived by the higher protection layer. The equivalent capacity at risk is referred to as the vulnerable capacity in the following, for simplicity.

Step S30 is carried out for each candidate, after having computed the first indicators (step S20) and prior to computing the second reliability indicators (step S40). The resulting vulnerable capacities can advantageously be used as inputs to the next step S40. That is, the second parameters can notably be obtained S40 based on both the MTTDL (as computed at step S20 for each distinct type of storage units) and the vulnerable capacity as estimated at step S30 for each storage unit.

That is, the vulnerable capacity of each storage unit is estimated for reliability assessment purposes, based on the EADLC values, which makes it possible to more precisely estimate the actual capacity of the storage units, on the second level. The same considerations may also apply at a further level (as in FIG. 3), if necessary.

Moreover, the first parameters may include a mean time to failure (MTTF) of each of the storage devices 5. Similarly, the second parameters may include a MTTF of each distinct type of storage units 4. Indeed, the functions that are typically used to compute the reliability indicators require MTTF values as inputs. However, such functions typically do provide MTTDL values in output. Therefore, the MTTF of the storage unit is normally not available for computations to be performed at step S40. Yet, the MTTDL of the storage units 4 is available, thanks to the first reliability indicators computed at step S20. Therefore, the MTTDL values can judiciously be used in place of the MTTF values. That is, the MTTF of each distinct type of storage units 4 can be obtained by setting S30 it equal to the MTTDL as obtained at step S20. The same principles can be applied to larger hierarchies: setting the next-level MTTF values equal to the MTTDL values obtained from the previous level allows to propagate reliability computations to the next level.

Additional parameters may advantageously be used to compute the reliability indicators. To start with, the first parameters may notably include the number of storage devices 5 and their memory storage capacity, in addition to their MTTF. In addition, the first parameters may include the number of storage units 4, as well as parameters concerning the partitions, that is, how many storage devices are comprised in each of the storage units. Preferably, the first parameters additionally include parameters relating to a data placement scheme of data throughout the storage devices 5 of the storage units 4. The data placement scheme may notably be a symmetric data placement scheme, a clustered data placement scheme, and a declustered data placement scheme. More preferably though, the data placement scheme is assumed to be a declustered data placement scheme and, this, for each candidate, as such a placement scheme was found to be more reliable, on average, using metrics developed by embodiments of the present invention. More generally, however, various combinations can possibly be contemplated. For example, the set of candidate storage systems 1, 2 may comprise systems having distinct placement schemes. For example, one or more systems may be assumed to rely on a symmetric data placement scheme, one or more systems may use a clustered data placement scheme, and one or more systems may assume a declustered data placement scheme.

Moreover, the first parameters may additionally include a rebuild bandwidth of each of the storage devices 5. In addition, the first parameters may include parameters of the protection scheme used at the level of the storage devices 5. Similarly, the second parameters may include parameters related to the protection scheme used at the level of the storage units 4.

The MTTDL, EAFDL, and E(H) quantities can, for example, be obtained using analytical functions disclosed in [1]. In particular, equations 82, 83, and 84 can be used when a declustered data placement scheme is assumed. These equations indeed assume a declustered placement scheme, which is a special case of the symmetric data placement scheme. The above equations are derived from equations 30, 31, and 32 in [1], which pertain to a symmetric data placement scheme. Accordingly, equations 30, 31, and 32 can be used for symmetric data placement schemes. For completeness, the above quantities can be computed according to equations 68, 74, and 75 in [1] when assuming a clustered data placement scheme.

Other useful considerations are provided in references [5, 6, 7]. For the replication systems considered in [6], E(H) is associated with user data lost. For general erasure coded systems, reference [1] defines E(H) as the expected amount of user data lost, given that data loss has occurred. It is obtained in closed form in equation 27, which then leads to equations 75 and 84 for the clustered and declustered data placement schemes, respectively.

The storage models considered in references [1, 5, 6, 7] are realistic models. For example, they properly capture the characteristics of the erasure coding and rebuild process associated with a declustered placement scheme, as currently used by many information technology actors. However, there may be other data placement variants for which appropriate closed-form expressions may be obtained for computing the corresponding reliability metrics. Such closed-form expressions may possibly be derived from equations given in the above references.

The above embodiments have been succinctly described in reference to the accompanying drawings and may accommodate a number of variants. Several combinations of the above features may be contemplated. An example is discussed below, which concerns another aspect, of the invention, that is, a method of designing a storage system having a prescribed reliability. This additional method first comprises formulating S10 specifications for each candidate of a set of candidate storage systems, as described earlier. Then, a reliability is determined for each candidate by computing first and second reliability indicators. The first reliability indicators are computed S20 for each distinct type of storage units 4 (and for each candidate), based on first parameters obtained from the specifications formulated at step S10. The first reliability indicators comprise a MTTDL, an EAFDL, and an EADLC. Then, the vulnerable capacity of each storage unit 4 is estimated (step S30, for each candidate), based on the EADLC computed for each distinct type of storage units. This way, the second reliability indicators (including an MTTDL and an EAFDL) can be computed (step S40) for each candidate), based on second parameters obtained according to the MTTDL (as computed for each distinct type of storage units) and the vulnerable capacity as estimated for each of the storage units 4. Eventually, a set of second reliability indicators are obtained, which pertain to the set of candidate storage systems, respectively.

Figure 4:
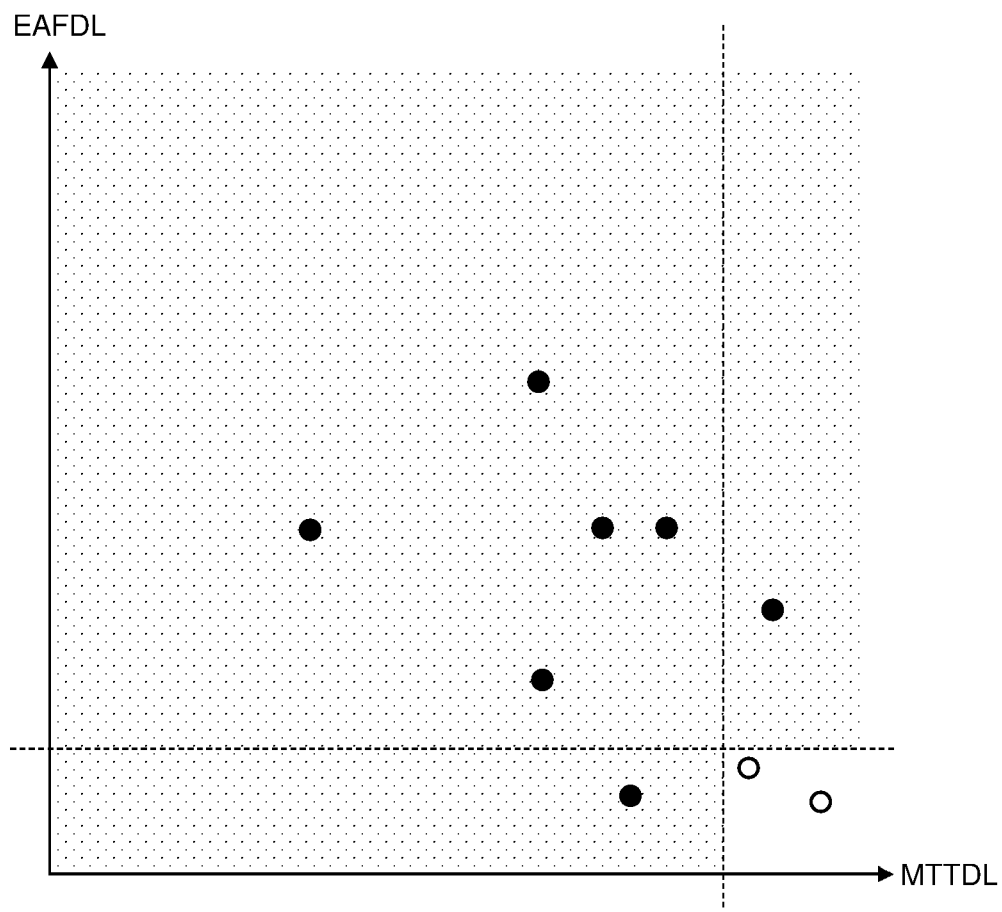
FIG. 4 is a two-dimensional (2D) plot illustrating outcomes of computations of two reliability indicators for several candidate storage systems, as in embodiments. Each candidate system gives rise to one point (black or white dot) but only a subset of the points (white dots) match a prescribed reliability.

Finally, indicators that match the prescribed reliability are identified (step S60), which correspond to a given storage system among the candidates, as illustrated in FIG. 4. FIG. 4 schematically illustrates outcomes of computations of MTTDL and EAFDL indicators for several candidate systems. Each candidate system gives rise to one point (black or white dot). In this example, the reliability prescribed for the system to be achieved requires a minimal MTTDL and a maximal EAFDL. Thus, all points (black dots) that are below a given MTTDL threshold and above a given EAFDL threshold characterize unsuitable systems (in the dotted area). On the contrary, all points in the white area denote systems that match (or, in fact, exceed) the minimal reliability requirements prescribed. Additional criteria may be used to select the final system, for example, based on expected supply costs. The corresponding specifications are stored at step S70, for example, in view of building this storage system.

A preferred flow of operations is shown in FIG. 1. At step S10, specifications of all candidate storage systems are formulated. A first or next candidate is chosen at step S15. At step S20, the first reliability indicators {MTTDL, EAFDL, and E(H)} are computed for each type of storage units 4 of the currently selected candidate, based on parameters extracted from the formulated specifications. At step S30, the vulnerable capacity of each storage unit is estimated, based on the metric value E(H) as computed for each distinct type of storage units. In addition, the MTTF of each storage unit is set equal to its MTTDL. This way, at step S40, second reliability indicators (MTTDL, EAFDL) can be computed for the candidate, based on the MTTF, as well as the vulnerable capacity of the storage units, and other parameters, as exemplified earlier. The second reliability indicators are buffered at step S50. The reliability indicators of the next candidate are then computed (S55: No). In variants, all candidates are processed in parallel. In both cases, once all candidates have been processed (S55: Yes), those indicators that match the prescribed reliability are identified at step S60. One candidate is finally selected, and its specifications are stored at step S70, in view of building a corresponding system or reconfiguring an existing storage system according to the stored specifications, step S80.

Figure 5:
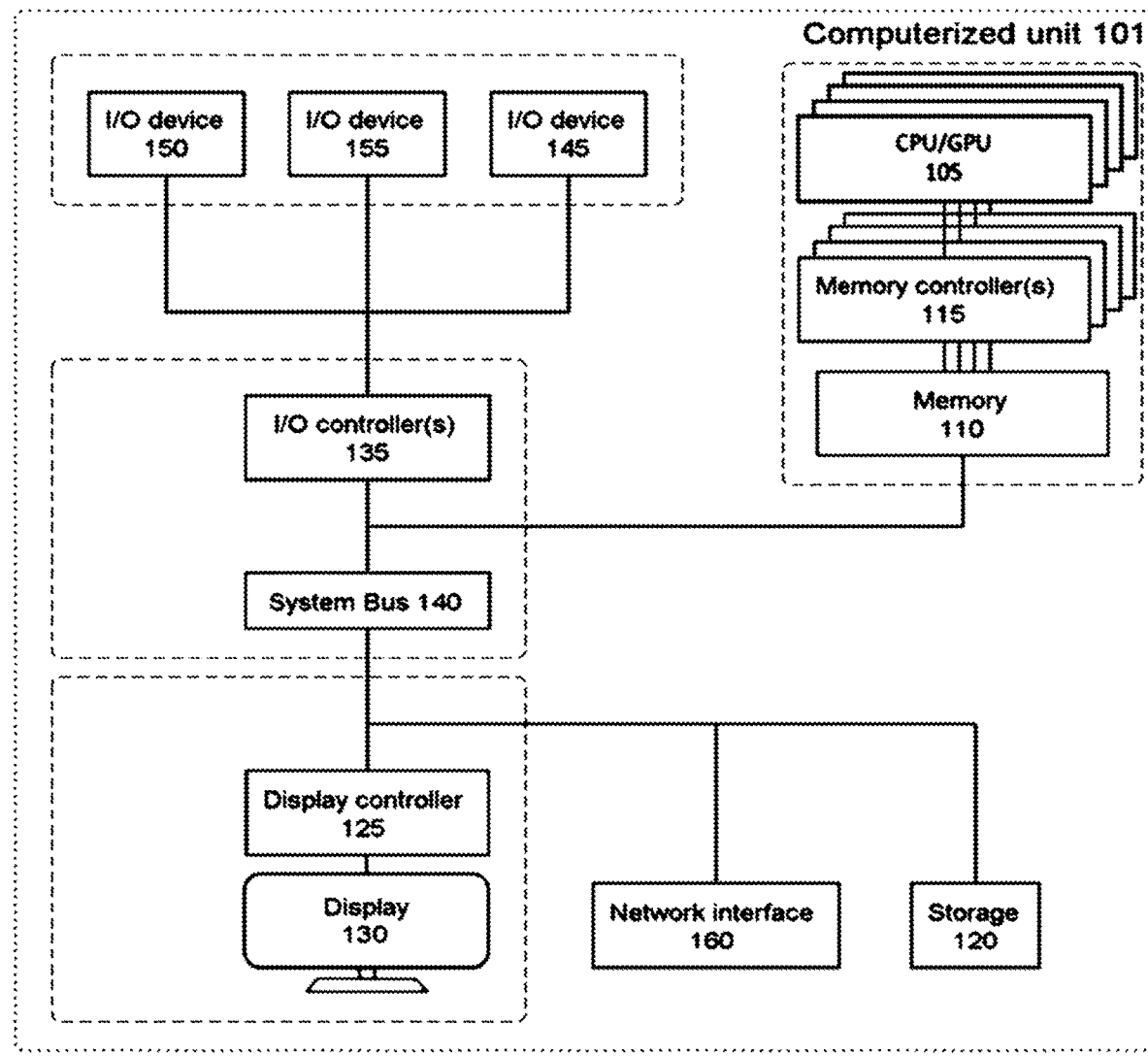
FIG. 5 schematically represents a general-purpose computerized system, suited for implementing one or more method steps as involved in embodiments of the invention.

According to a final aspect, the invention can also be embodied as a computer program product. This product comprises a computer readable storage medium having program instructions embodied therewith. Such program instructions may for instance be run (at least partly) on a computerized unit 101 such as depicted in FIG. 5, for designing a storage system having a prescribed reliability. The program instructions are executable by one or more processing units (for example, such as central processing units and/or graphics processing units 105 shown in FIG. 5). When executed by a computerized unit 101 such as shown in FIG. 5, these program instructions will cause the processing means to take steps according to a design method as described herein.

Additional aspects of the present computer program products are discussed in detail in sect. 2.4. The computerized unit 101 is described in detail in section 2.3.

2. Particularly Preferred Embodiments, Examples, and Technical Implementation Details 2.1 Particularly Preferred Embodiments All candidate storage systems are assumed to comprise several generic storage units 4 that have their own protection schemes P1 over storage devices (internal media devices) 5. This implies that internal media device failures do not necessarily lead to unit failures. More specifically, by contrast to the typical case of unit failures where all data stored is considered to be lost, in this case only some internal media devices 5 of a storage unit 4 may fail. This implies that only a portion of the data of the corresponding storage unit may be lost. If this data cannot be recovered by the protection scheme deployed, then this data is permanently lost. By contrast, data on the remaining internal media devices 5 is not lost and can still be accessed.

To improve the system reliability, one may apply an additional protection layer P2 over the storage units 4. The second protection layer P2 aims at recovering portions of data lost within the storage units 4. This way, generic storage units 4 may experience data loss owing to either complete failures or partial failures due to internal media device failure(s), but this data can usually be recovered by the additional capability of the second protection scheme P2. Similarly, an additional protection layer P3 may be provided over an upper layer 3 in the hierarchy, such that failures on the second level may be recovered on the third level (see FIG. 3), and so on. In the following, only two levels are assumed, as in FIG. 2, for simplicity. However, the two-layer protection scheme discussed below can be extended to multiple protection layers.

The proposed approach can be compared to the approach used by the nested, two-dimensional (2D) RAID-5 HDD systems, such as RAID-51, which use non-Maximum Distance Separable (MDS) erasure codes and can sustain any three device (HDD) failures, as well as certain subsets of more than three device failures [2, 3]. Each device is mirrored, and the new configuration is protected using the RAID-5 concept. Another variant is the 2D RAID-5 array, where rows and columns of devices are separately protected via RAID-5. However, the present configuration cannot be considered as a 2D array because there is no knowledge as to where data is placed within each of the devices and data placement within the generic storage device may change over time, for example, as a result of wear leveling techniques implemented within the generic storage device. Note, however, that wear leveling can also be implemented across SSDs within a storage pod, which would create a similar uncertainty regarding data placement one level higher in the hierarchy.

In the present context, partial generic storage unit failures (due to internal media device failures that exceed the level of protection provided by the generic storage unit) may not lead to complete loss of data, but only to a portion of this data. Consequently, to achieve a certain reliability level, the second protection layer does not need to be as strong as in the case where a storage unit failure implies a complete data loss. In other cases, upon failure of a generic storage unit all data within that storage unit may be lost. The following describes a method to configure the entire system and appropriately dimension the second protection scheme to achieve a certain reliability level. To this end, an analytical approach is relied on, which efficiently assesses the overall system reliability, in terms of the MTTDL and the EAFDL. This makes it possible to precisely and judiciously dimension the system to meet specific reliability requirements. Note, large-scale storage systems are considered, which employ erasure-coding redundancy schemes. These schemes also allow accessing data when devices are temporarily unavailable.

The MTTDL and EAFDL metrics of the system are obtained based on the characteristics of the storage subsystems at the highest protection level as well as the parameters of the protection scheme deployed at the highest level (below the system level), that is, the storage units at the second level in the example of FIG. 2. The characteristics of the storage units are obtained based on their capacity, internal rebuild bandwidth, number of internal media devices, as well as the parameters of internal protection scheme deployed over the internal media devices. This procedure is repeatedly applied in the case of multiple protection layers.

First, various system architectures are inferred for the storage system 1. This gives rise to various potential systems, each comprising one or more storage units (for example, storage pods) 4, where each storage unit includes a set of storage devices (for example, internal media devices such as HDDs) 5. Each storage device 5 is associated with certain device parameters and each layer (that is, the device layer and the storage unit layer) is associated with a certain protection scheme.

Next, for each potential system of the inferred system architectures, the following operations are performed, which aim at obtaining the reliability of each potential system. First, a triplet of metric values {MTTDL, EAFDL, and E(H)} are computed for each distinct type of storage units 4 of the candidate system, using a stochastic analysis as discussed in reference [1, 5, 6, 7]. Such metrics are computed based on the MTTF and the capacity of each storage device (internal media device) 5, their number in the system, the data placement scheme for data therein, as well as other parameters including the rebuild bandwidth of the storage units and the parameters of the protection scheme of that layer. The value E(H) of the triplet obtained allows the vulnerable capacity of each storage unit to be accurately estimated, for reliability assessment purposes. Also, the MTTF of each storage unit 4 is set equal to the MTTDL obtained. Finally, based on the number of storage units, the MTTF, and capacity as obtained for each storage unit 4, as well as the protection scheme chosen for the layer containing all the storage units 4, a pair of metric values {MTTDL, EAFDL} are computed, which pertains to the potential system as currently investigated. This pair denotes the reliability of this candidate system. Eventually, several reliability scores (pairs) are obtained, one pair for each candidate system. One of the system architectures is eventually selected, according to the prescribed reliability. That is, the architecture selected must match the prescribed reliability. An actual system is finally built or reconfigured according to the device parameters and protection schemes corresponding to the selected system architecture.

This method takes advantage of schemes as proposed in [1, 5, 6, 7] to compute the triplet of metric values for each layer. However, such metrics are difficult to reverse. As explained in section 1, it is not possible (or very difficult), given a prescribed reliability of the system, to directly compute a suitable system architecture (configuration). Thus, what is proposed here is a nested scheme, which, given many potential architectures inferred, computes corresponding system reliabilities (by propagating metric values from one layer to the next) and then select a system matching the prescribed reliability level. A very fortunate by-product of the proposed method is that it allows the system reliability to be much more accurately evaluated than before, because the vulnerable capacity of each storage unit 4 is judiciously obtained from the corresponding E(H), which reflects the amount of data lost upon failure as opposed to the total amount of data stored in a storage unit. Moreover, the proposed method can be reapplied as the volume of stored data changes to keep data reliability of the system at an optimal level.

2.2 Examples of Applications of the Particularly Preferred Embodiments

To illustrate how the proposed scheme works, one may consider the case of two protection layers. First, the procedure considers the reliability characteristic of the generic storage devices 5 at the lowest layer. The reliability of a device 5 is expressed by: the mean time to data loss, noted $MTTDL_g$; the expected annual fraction of data loss, noted $EAFDL_g$; and the expected amount of user data lost, given that data loss has occurred, noted $E(H_g)$. These metrics are evaluated by considering the number of internal media devices $(n_i)$ that a storage unit 4 comprises, the mean time to failure, noted $MTTF_i$, the storage capacity $(c_i)$ of each of the internal media devices 5, the internal rebuild bandwidth (be), and the parameters (noted $m_g$ and $l_g$) of the erasure-coded scheme deployed (first-protection layer) within the devices.

For example, consider a generic storage unit (pod) that comprises $n_i=80$ HDDs, where each HDD stores an amount of $c_i=10$ TB and has a mean time to failure ($MTTF_i$) value of 300,000 hours. Data is protected by deploying a (10, 8) MDS erasure code ($m_i=10$, $l_i=8$). Assuming a declustered placement scheme, an internal rebuild bandwidth of $b_i=50$ MB/s, and using the closed-form expressions presented in [5] $MTTDL_g=2.7\ 10^6$ years is obtained, $EAFDL_g=5.4\ 10^{-11}$, and $E(H_g)=0.0093 \times c_i=93.5$ GB.

A pessimistic scenario assumes that all user data of the generic storage unit 5 is lost, which in the above example is $c_e=(l_i/m_i) \times n_i \times c_i=(8/10) \times 80 \times 10\ TB=640\ TB$. Note, this value $c_e$ corresponds to the effective capacity, that is, the equivalent capacity that the user sees. Now, the equivalent storage capacity may be derived at risk $c_g$ of a device (that is, the vulnerable capacity), which is the expected amount of data lost when a device fails. From the preceding, it follows that $c_g=(m_i/l_i) \times E(H_g)$, which in the case of the example is $c_g=(10/8) \times 93.5\ GB=117\ GB$.

Subsequently, consider the second protection layer implemented across a number $n_g$ of generic storage units 4 and then assess the reliability level of the system. The corresponding reliability metrics are obtained using the expressions given in [5] with the corresponding parameters $n_g$, $MTTF_g=MTTDL_i$, $c_g$, the rebuild bandwidth $(b_g)$, and the parameters $m_g$ and $l_g$ of the erasure-coded scheme deployed at the second protection layer.

For example, consider a second protection layer across $n_g=16$ generic storage units 4, where each unit stores an amount $c_g$ of data and has an $MTTF_g$ value of $2.7\ 10^6$ years. Data is protected by deploying a (16, 14) MDS erasure code ($m_g=16$, $l_g=14$), which corresponds to a clustered RAID-6 placement scheme. Assuming a rebuild bandwidth of $b_g=100$ MB/s, and using the expressions given in [5], the system reliability metrics can be obtained as follows: $MTTDL_g=1016$ years, $EAFDL_g=3.4\ 10^{-16}$.

This calculation, however, underestimates system reliability significantly given that a failure of a generic device does not imply a loss of all of its data. This issue is addressed by considering the vulnerable capacity, and not the actual storage capacity of the units, that is, $c_g=(m_i/l_i)\times E(H_g)$. In the case of the example, $c_g=117$ GB, which in turn yields $MTTDL_g=4.8\ 10^{23}$ years, $EAFDL_g=7.3\ 10^{-27}$. Clearly, this reliability is much higher than the one obtained by the pessimistic, worst-case approach.

Now instead, consider the second protection layer across $n_g=15$ generic storage units 4, using an (15, 14) MDS erasure code ($m_g=15$, $l_g=14$), which corresponds to a clustered RAID-5 placement scheme, $MTTDL_g=5.3\ 10^{13}$ years is obtained, $EAFDL_g=7\ 10^{-17}$. The system comprises a total of 80×15=1200 disk drives.

Note that when the generic device is not internally protected, to obtain a similar reliability level, a much stronger protection scheme needs to be applied across the generic devices. In the case of the example considered, a generic device will now comprise 64 instead of 80 disk drives. Assuming a (30, 14) MDS erasure code to protect a number of $n_g=30$ generic devices yields $MTTDL_g=8.7\ 10^{13}$ years, $EAFDL_g=3.8\ 10^{-16}$. This reliability level is similar to the one obtained above in the case of (15, 14) MDS second-layer erasure code. The system now comprises a total of 64×30=1920 disk drives. The multi-layered protection scheme can achieve the same reliability level as the one-level protection scheme in a more economic fashion. So, the proposed methodology enables a judicious selection of the parameters for the various protection layers in order to achieve a desired reliability level.

2.3 Computerized Systems and Devices

Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, partly interactive or non-interactive system. The methods described herein can be implemented in software, hardware, or a combination thereof. In exemplary embodiments, the methods proposed herein are implemented in software, as an executable program, the latter executed by suitable digital processing devices. More generally, embodiments of the present invention can be implemented wherein virtual machines and/or general-purpose digital computers, such as personal computers, workstations, etc., are used.

For instance, the system depicted in FIG. 5 schematically represents a computerized unit 101, for example, a general- or specific-purpose computer.

In exemplary embodiments, in terms of hardware architecture, as shown in FIG. 5, the unit 101 includes at least one processor 105, a cache memory (not shown), and a memory 110 coupled to one or more memory controllers 115. Preferably though, several processors are involved, to allow parallelization, as discussed earlier. To that aim, the processing units may be assigned respective memory controllers, as known per se.

One or more input and/or output (I/O) devices 145, 150, 155 (or peripherals) are communicatively coupled via a local input/output controller 135. The I/O controller 135 can be coupled to or include one or more buses and a system bus 140, as known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor(s) 105 is (are) a hardware device for executing software, particularly that initially stored in memory 110. The processor(s) 105 can be any custom made or commercially available processor(s), may include one or more central processing units (CPUs) and/or one or more graphics processing units (GPUs), or, still, have an architecture involving auxiliary processors among several processors associated with the computer 101. In general, it may involve any type of semiconductor-based microprocessor (in the form of a microchip or chip set), or generally any device for executing software instructions.

The memory 110 can include any one or combination of volatile memory elements (for example, random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor(s) 105.

The software in memory 110 may include one or more separate programs, each of which comprises an ordered listing of executable instructions for implementing logical functions. In the example of FIG. 5, the software in the memory 110 includes computerized methods, forming part of all of the methods described herein in accordance with exemplary embodiments and, in particular, a suitable operating system (OS). The OS essentially controls the execution of other computer programs and provides scheduling, input-output control, file and data management, memory management, and communication control and related services.

The methods described herein (or part thereof) may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS. Furthermore, the methods can be written as an object-oriented programming language, which has classes of data and methods, or a procedure programming language, which has routines, subroutines, and/or functions.

Possibly, a conventional keyboard and mouse can be coupled to the input/output controller 135. Other I/O devices 145-155 may be included. The computerized unit 101 can further include a display controller 125 coupled to a display 130. In exemplary embodiments, the computerized unit 101 can further include a network interface or transceiver 160 for coupling to a network, to enable, in turn, data communication to/from other, external components.

The network transmits and receives data between the unit 101 and external devices. The network is possibly implemented in a wireless fashion, for example, using wireless protocols and technologies, such as Wifi, WiMax, etc. The network may be a fixed wireless network, a wireless local area network (LAN), a wireless wide area network (WAN) a personal area network (PAN), a virtual private network (VPN), intranet or other suitable network system and includes equipment for receiving and transmitting signals.

The network can also be an IP-based network for communication between the unit 101 and any external server, client and the like via a broadband connection. In exemplary embodiments, network can be a managed IP network administered by a service provider. Besides, the network can be a packet-switched network such as a LAN, WAN, Internet network, an Internet of things network, etc.

If the unit 101 is a PC, workstation, intelligent device or the like, the software in the memory 110 may further include a basic input output system (BIOS). The BIOS is stored in ROM so that the BIOS can be executed when the computer 101 is activated. When the unit 101 is in operation, the processor(s) 105 is(are) configured to execute software stored within the memory 110, to communicate data to and from the memory 110, and to generally control operations of the computer 101 pursuant to the software.

The methods described herein and the OS, in whole or in part are read by the processor(s) 105, typically buffered within the processor(s) 105, and then executed. When the methods described herein are implemented in software, the methods can be stored on any computer readable medium, such as storage 120, for use by or in connection with any computer related system or method.

2.4 Computer Program Products

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made, and equivalents may be substituted without departing from the scope of the present invention. In particular, a feature recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

An embodiment of a method of designing a storage system having a prescribed reliability includes the following operations (not necessarily in the following order): (i) formulating specifications for each candidate of a set of candidate storage systems, wherein said each candidate comprises two or more storage units, each including a set of storage devices; (ii) for said each candidate, determining a reliability of said each candidate by: (a) computing first reliability indicators for each distinct type of the storage units of said each candidate, based on first parameters obtained from the specifications formulated for said each candidate, wherein the first reliability indicators comprise a mean time to data loss, or MTTDL, an expected annual fraction of data loss, or EAFDL, and an expected amount of data lost conditioned on a fact that a data loss occurred, or EADLC, (b) estimating an equivalent memory storage capacity at risk of each of the storage units of the candidate based on the EADLC computed for each distinct type of the storage units, and (c) computing, for said each candidate, second reliability indicators including an MTTDL and an EAFDL, based on second parameters obtained according to the MTTDL as computed for each distinct type of the storage units and the equivalent memory storage capacity at risk as estimated for each of the storage units, so as to obtain a set of second reliability indicators corresponding to the set of candidate storage systems, respectively; (iii) identifying, within said set of second reliability indicators, given indicators that match the prescribed reliability, the given indicators corresponding to a given storage system of the candidate storage systems; and (iv) storing the specifications of the given storage system.

What is claimed is:

1. A computer-implemented method of designing a storage system having a prescribed reliability, the method comprising:

formulating specifications for each candidate storage system design of a plurality of candidate storage system designs, wherein said each candidate storage system design includes a plurality of storage units, with each candidate storage system design including a set of storage devices;

for each given candidate storage system design of the plurality of candidate storage system designs, determining a reliability of the given candidate storage system design by:

computing a plurality of first reliability indicators for each distinct type of the storage units of the given candidate storage system design based on first parameters obtained from the specifications formulated for the given candidate storage system design, and computing a plurality of second reliability indicators for the given candidate storage system design, based on second parameters obtained from the first reliability indicators;

identifying, within the plurality of second reliability indicators, matching indicator(s) that match the prescribed reliability and that correspond to a matching storage system design from the plurality of candidate storage system designs; and storing the specifications of the matching storage system design.

2. The computer-implemented method according to claim 1, wherein:

the first reliability indicators and the second reliability indicators comprise, each, a mean time to data loss, or MTTDL, and an expected annual fraction of data loss, or EAFDL, and the first reliability indicators additionally comprise an expected amount of data lost conditioned on a fact that a data loss occurred, or EADLC.

3. The computer-implemented method according to claim 2, the method further comprising:

for each given candidate storage system design of the plurality of candidate storage system designs, estimating an equivalent memory storage capacity at risk of each of the storage units of the given candidate storage system design based on the EADLC computed for each distinct type of the storage units; and wherein the second parameters are obtained based on the MTTDL as computed for each distinct type of the storage units and the equivalent memory storage capacity at risk as estimated for each of the candidate storage system design of the plurality of candidate storage system designs.

4. The computer-implemented method according to claim 3, wherein:

the first parameters include a mean time to failure, or MTTF, of each of the storage devices; and the second parameters include an MTTF of each distinct type of the storage units, wherein the MTTF of each distinct type of the storage units is obtained by setting it equal to the MTTDL as computed for said each distinct type of the storage units.

5. The computer-implemented method according to claim 4, wherein:
said first parameters include, in addition to the MTTF of each of the storage devices of each given candidate storage system design of the plurality of candidate storage system designs:
a number of storage devices of the given candidate storage system design; and
a memory storage capacity of each of the storage devices of the candidate storage system designs.

6. The computer-implemented method according to claim 5, wherein:
said first parameters additionally include parameters relating to a data placement scheme of data throughout the storage devices of the storage units.

7. The computer-implemented method according to claim 6, wherein:
said data placement scheme is one of a symmetric data placement scheme, a clustered data placement scheme, and a declustered data placement scheme.

8. The computer-implemented method according to claim 7, wherein:
the plurality of candidate storage system designs includes at least one candidate storage system design characterized by each of the following types of data placement schemes: symmetric, clustered and declustered.

9. The computer-implemented method according to claim 6, wherein:
said first parameters additionally include a rebuild bandwidth of each of the storage devices.

10. The computer-implemented method according to claim 9, wherein:
said first parameters additionally include parameters of a protection scheme of the storage devices of the storage units.

11. The computer-implemented method according to claim 4, wherein:
said second parameters additionally include a number of the storage units.

12. The computer-implemented method according to claim 11, wherein:
said second parameters additionally include parameters related to a protection scheme of the storage units of said each candidate.

13. The computer-implemented method according to claim 1, wherein:
the first reliability indicators are computed by a set of first functions that respectively take the first parameters as arguments;
the second reliability indicators are computed by a set of second functions that respectively take the second parameters as arguments; and
each of the first functions and the second functions are non-invertible functions.

14. The computer-implemented method according to claim 1, wherein:
at least one of the storage units of one or more of the candidate storage system designs includes a storage pod, the storage devices of which are hard disk drives.

15. The computer-implemented method according to claim 14, wherein:
each of the storage units of each of the candidate storage systems is a storage pod including hard disk drives.

16. The computer-implemented method according to claim 1, wherein:
each of the storage units is assumed to be configured in said each candidate as a redundant array of independent disks.

17. A computer program product of designing a storage system having a prescribed reliability, the computer program product comprising:
a set of storage device(s); and
computer code stored collectively in the set of storage device(s), with the computer code including data and instructions to cause a processor(s) set to perform at least the following operations:
formulating specifications for each candidate storage system design of a plurality of candidate storage system designs, wherein said each candidate storage system design includes a plurality of storage units, with each candidate storage system design including a set of storage devices,
for each given candidate storage system design of the plurality of candidate storage system designs, determining a reliability of the given candidate storage system design by:
computing a plurality of first reliability indicators for each distinct type of the storage units of the given candidate storage system design based on first parameters obtained from the specifications formulated for the given candidate storage system design, and
computing a plurality of second reliability indicators for the given candidate storage system design, based on second parameters obtained from the first reliability indicators;
identifying, within the plurality of second reliability indicators, matching indicator(s) that match the prescribed reliability and that correspond to a matching storage system design from the plurality of candidate storage system designs, and
storing the specifications of the matching storage system design.

18. The computer program product according to claim 17, wherein:
the first reliability indicators and the second reliability indicators comprise, each, a mean time to data loss, or MTTDL, and an expected annual fraction of data loss, or EAFDL, and
the first reliability indicators additionally comprise an expected amount of data lost conditioned on a fact that a data loss occurred, or EADLC.

19. The computer program product according to claim 18, wherein the computer code further includes instructions for causing the processor(s) set to perform the following operation(s):
for each given candidate storage system design of the plurality of candidate storage system designs, estimating an equivalent memory storage capacity at risk of each of the storage units of the given candidate storage system design based on the EADLC computed for each distinct type of the storage units; and
wherein the second parameters are obtained based on the MTTDL as computed for each distinct type of the storage units and the equivalent memory storage capacity at risk as estimated for each of the candidate storage system design of the plurality of candidate storage system designs.

20. A computer system comprising:

a processor(s) set;

a set of storage device(s); and computer code stored collectively in the set of storage device(s), with the computer code including data and instructions to cause the processor(s) set to perform at least the following operations:

formulating specifications for each candidate storage system design of a plurality of candidate storage system designs, wherein said each candidate storage system design includes a plurality of storage units, with each candidate storage system design including a set of storage devices, for each given candidate storage system design of the plurality of candidate storage system designs, determining a reliability of the given candidate storage system design by:

computing a plurality of first reliability indicators for each distinct type of the storage units of the given candidate storage system design based on first parameters obtained from the specifications formulated for the given candidate storage system design, and computing a plurality of second reliability indicators for the given candidate storage system design, based on second parameters obtained from the first reliability indicators;

identifying, within the plurality of second reliability indicators, matching indicator(s) that match the prescribed reliability and that correspond to a matching storage system design from the plurality of candidate storage system designs, and storing the specifications of the matching storage system design.

* * * * *